(12) United States Patent
Ohkawa et al.

(10) Patent No.: US 7,175,889 B2
(45) Date of Patent: Feb. 13, 2007

(54) RETARDATION FILM AND COMPOUND

(75) Inventors: Atsuhiro Ohkawa, Kanagawa (JP); Michitaka Matsuumi, Kanagawa (JP); Hideyuki Nishikawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 356 days.

(21) Appl. No.: 10/801,662

(22) Filed: Mar. 17, 2004

(65) Prior Publication Data
US 2004/0185186 A1 Sep. 23, 2004

(30) Foreign Application Priority Data
Mar. 17, 2003 (JP) .............................. 2003-072033

(51) Int. Cl.
*G02B 5/30* (2006.01)
*G02F 1/1335* (2006.01)

(52) U.S. Cl. ...................................... 428/1.1; 349/117

(58) Field of Classification Search ................. 428/1.1; 349/117
See application file for complete search history.

(56) References Cited

U.S. PATENT DOCUMENTS

| 3,711,567 | A | * | 1/1973 | Innes ........................... 585/26 |
| 5,883,685 | A | | 3/1999 | Mazaki et al. |
| 6,245,398 | B1 | | 6/2001 | Matsuoka et al. |
| 6,461,694 | B1 | | 10/2002 | Nishikawa et al. |

FOREIGN PATENT DOCUMENTS

| DE | 44 22 332 A1 | 1/1996 |
| EP | 0847228 A2 | 6/1998 |
| JP | 8-327822 A | 12/1996 |
| JP | 2001-166147 A | 6/2001 |
| JP | 2003-109765 A | 4/2003 |
| WO | 96/00208 A1 | 1/1996 |

OTHER PUBLICATIONS

Sanjay K. Varshney et al., "Novel Liquid-Crystalline Mercury Acetylide Complexes", Mol. Cryst. Liq. Cryst., 2001, pp. 55-65, vol. 357, Overseas Publishers Association N.V., Malaysia.

Sandeep Kumar et al., "Design and Synthesis of Discotic Nematic Liquid Crystals", Organic Letters, 2002, pp. 157-159, vol. 4, No. 2, American Chemical Society.

Sandeep Kumar et al., "Novel Hexasubstituted Triphenylene Discotic Liquid Crystals Having Three Different Types of Peripheral Substituent", Liquid Crystals, 2002, pp. 899-906, vol. 29, No. 7, Taylor & Francis Ltd.

EPO Search Report dated Jun. 25, 2004 in EP Application No. 04006363.8-2103.

Vladimir V. Tsukruk et al, "Discotic Twin and Triple Molecules with Charge-Transfer Interactions in Langmuir-Biodgett Films," Langmuir, vol. 12, 1996, pp. 754-757, American Chemical Society (XP-001181956).

M. Manickam et al., "Introduction of bis-discotic and bis-calamitic mesogenic addends to $C_{60}$," Liquid Crystals, vol. 29, No. 4, 2002, pp. 497-504, Taylor and Francis Ltd. (XP-001082966).

W. Kreuder et al., "The 'Wheel of Mainz' as a Liquid Crystal?- Structural Variation and Mesophase Properties of Trimeric Discotic Compounds," Angew. Chem. Int. Ed. Engl., vol. 26, No. 12, 1987, pp. 1249-1252, Verlagsgesellschaft mbH (XP-002070552).

* cited by examiner

*Primary Examiner*—Shean C Wu
(74) *Attorney, Agent, or Firm*—Buchanan Ingersoll & Rooney PC

(57) ABSTRACT

To provide a retardation film (optical compensation sheet) using a liquid crystal compound excellent in both the wavelength dispersion property and the refractive index anisotropy, disclosed is a retardation film having an optically anisotropic layer formed of a compound represented by formula (I): $[(R^1)a—M—(L^1)]b—(L^2)$, wherein $R^1$ represents an alkyl group, at least one —$CH_2$— group in the alkyl group may be substituted by —O—, —S—, —C(=O)—, —N($R^2$)—, —CH=CH— or —C≡C—, $R^2$ represents a hydrogen atom or an alkyl group, M represents a group comprising three or more aromatic rings, $L^1$ represents a single bond or a divalent alkylene group, the —$CH_2$— group in the alkylene group may be substituted by —O—, —S—, —C(=O)— or —N($R^2$)—, $L^2$ represents a b-valent cyclic, alkene or alkyne group, a represents the number of $R^1$s substituted to M, and b represents an integer of 2 to 6.

6 Claims, No Drawings

RETARDATION FILM AND COMPOUND

BACKGROUND OF THE INVENTION

1. Field of the Invention

The present invention relates to a retardation film (or retardation plate) using a novel liquid crystal.

2. Background Art

The STN-mode liquid crystal display device comprises an STN-mode liquid crystal cell, two polarizing plates (or polarizing films)) and one or two optical compensation sheet(s) (retardation film) provided between the STN-mode liquid crystal cell and the polarizing plate.

The liquid crystal cell comprises a rod-like liquid crystalline molecule, two substrates for enclosing the rod-like liquid crystalline molecule, and an electrode layer for applying a voltage to the rod-like liquid crystalline molecule. In the STN-mode liquid crystal cell, an alignment film for orienting (aligning) rod-like liquid crystalline molecules is provided on two substrates. Furthermore, the rod-like liquid crystalline molecules are oriented in twisted alignment at 180 to 360° by using a chiral agent. The STN-mode liquid crystal display device is characterized in that a large-capacity and sharp display can be obtained by time-division driving even with a simple matrix electrode structure not having an active device (e.g., thin-film transistor, diode).

In an STN-mode liquid crystal display device having no retardation film, the display image is colored to blue or yellow due to birefringence of the rod-like liquid crystal molecule. The coloration of the display image is disadvantageous to both the monochromatic display and the color display. The retardation film is used to eliminate such coloration and obtain a bright and sharp image. The retardation film is sometimes imparted also with a function of enlarging the viewing angle of the liquid crystal cell. For the retardation film, a stretched birefringent film has been conventionally employed. The retardation film for STN-mode liquid crystal display devices, obtained by using a stretched birefringent film, is described in Patent Document 1 (JP-A-7-104284 (the term "JP-A" as used herein means an "unexamined published Japanese patent application") and Patent Document 2 (JP-A-7-13021).

Patent Document 3 (JP-A-2001-166147) discloses a discotic liquid crystal having a large refractive index anisotropy, however, the wavelength dispersion property is worsened and the improvement of performance is insufficient. In general, the wavelength dispersion property and the refractive index anisotropy are in a trade-off relationship and when the refractive index anisotropy is increased, the wavelength dispersion property is deteriorated. Development of a technique for getting rid of this trade-off is being demanded.

Non-Patent Documents 1, 2 and 3 (*Molecular Crystals and Liquid Crystals*, Vol. 357, page 55 (2001); *Organic Letters*, Vol. 4, page 157 (2002); and *Liquid Crystals*, Vol. 29, page 899 (2002), respectively) disclose a bis-form discotic liquid crystal, but these documents are completely silent on the optical performance. Furthermore, this liquid crystal is colored to yellow due to its long conjugate system or contains a mercury and therefore, the practical use thereof as an optical member is improper. Also, Patent Document 4 (JP-A-8-327822) discloses a general formula for bis-form compounds of triphenylene, but in all of these compounds, the triphenylene ring has many aromatic rings (mainly a benzene ring) in the side chain and the molecule has a very large molecular weight, giving rise to problems such that the orientation proceeds slowly due to high viscosity and the refractive index anisotropy is small due to large molecular weight.

SUMMARY OF THE INVENTION

An object of the present invention is to provide a liquid crystal material excellent in both the wavelength dispersion property and the refractive index anisotropy, and a retardation film (optical compensation sheet) using the compound.

The above-described object can be attained by the retardation film and liquid crystal compound having the following constitutions.

1. A retardation film comprising a support having thereon an optically anisotropic layer formed of a compound represented by the following formula (I):

$$[(R^1)a-M-(L^1)]b-(L^2) \quad \text{Formula (I)}$$

wherein $R^1$ represents an alkyl group having from 1 to 20 carbon atoms, at least one —$CH_2$— group in the alkyl group may be substituted by —O—, —S—, —C(=O)—, —N($R^2$)—, —CH=CH— or —C≡C— but —O— and —O— are not directly bonded;

$R^2$ represents a hydrogen atom or an alkyl group having from 1 to 5 carbon atoms;

M represents a group comprising three or more aromatic rings;

$L^1$ represents a single bond or a divalent alkylene group having from 1 to 10 carbon atoms, at least one —$CH_2$— group in the alkylene group may be substituted by —O—, —S—, —C(=O)— or —N($R^2$)— but —O— and —O— are not directly bonded;

$L^2$ represents a b-valent cyclic, alkene or alkyne group;

a represents the number of $R^1$(s) substituted on M; and b represents an integer of 2 to 6.

2. The retardation film as described in 1 above, wherein in the compound represented by formula (I), the plurality of M(s) are not conjugated with each other by a multiple bond.

3. The retardation film as described in 1 or 2 above, wherein M in formula (I) is a group comprising a triphenylene ring.

4. The retardation film as described in any one of 1 to 3 above, wherein the compound represented by formula (I) exhibits liquid crystallinity.

5. The retardation film as described in any one of 1 to 4 above, wherein the compound represented by formula (I) is a liquid crystalline compound having a polymerizable group.

6. The retardation film as described in 1 above, wherein the compound represented by formula (I) is a compound represented by formula (II):

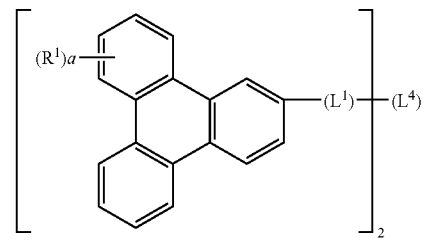

wherein $R^1$ and L1 each has the same meaning as in formula (I);

L⁴ represents a divalent cyclic, alkene or alkyne group; and e represents the number of R¹s substituted on each of the two triphenylene rings, provided that the two triphenylene rings bonded through L¹ and L⁴ are not conjugated.

7. A compound represented by formula (II).

8. The compound as described in 7 above, wherein the compound represented by formula (II) is a liquid crystalline compound having a polymerizable group.

DETAILED DESCRIPTION OF THE INVENTION

The retardation film of the present invention has an optically anisotropic layer formed of a compound represented by formula (I) on a support.

The term "formed of" as used in the present invention means at least one of the case where the optically anisotropic layer contains the compound represented by formula (I) and the case where the optically anisotropic layer contains a polymer of the compound represented by formula (I). For example, when the compound of the present invention has a polymerizable group (preferably when the compound of the present invention has a polymerizable group at the terminal), the optically anisotropic layer comes to contain a polymer of the compound represented by formula (I), and this embodiment is also included in the present invention.

The liquid crystal compound represented by formula (I) of the present invention is described below.

R¹ represents an alkyl group having from 1 to 20 carbon atoms and the —CH₂— group in the alkyl group may be substituted by —O—, —S—, —C(=O)—, —N(R²)—, —CH=CH— or —C≡C— but —O— and —O— are not directly bonded. R² represents a hydrogen atom or an alkyl group having from 1 to 5 carbon atoms (preferably a methyl group).

R¹ may have a substituent and the substituent is preferably a polymerizable group. The polymerizable group is preferably a polymerizable ethylenic unsaturated group or a ring-opening polymerizable group. Examples of the polymerizable ethylenic unsaturated group include (M-1) to (M-6) shown below.

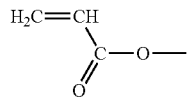
(M-1)

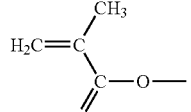
(M-2)

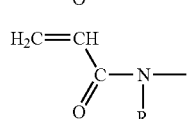
(M-3)

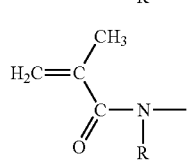
(M-4)

-continued

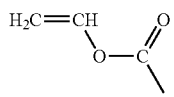
(M-5)

wherein R represents a hydrogen atom or a substituent, preferably a hydrogen atom or an alkyl group, more preferably a hydrogen atom or a methyl group.

Among (M-1) to (M-6), preferred are (M-1) and (M-2), more preferred is (M-1).

The ring-opening polymerizable group is preferably a cyclic ether group, more preferably an epoxy group or an oxetane group, still more preferably an epoxy group.

M represents a group comprising three or more aromatic groups and M is more specifically a group represented by the following formula:

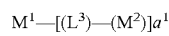
$M^1—[(L^3)—(M^2)]_{a^1}$ wherein M¹ and M² each independently represents a group having an aromatic group. Specific examples of the group having an aromatic group include the following groups:

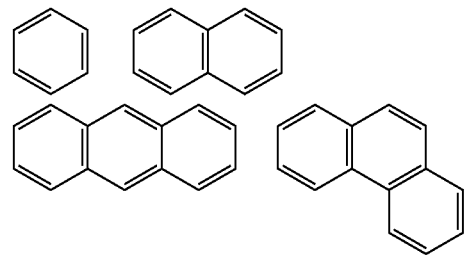

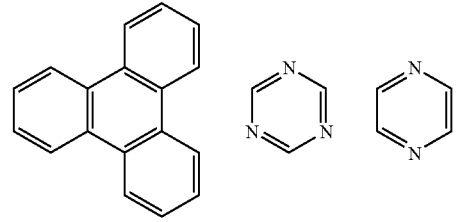

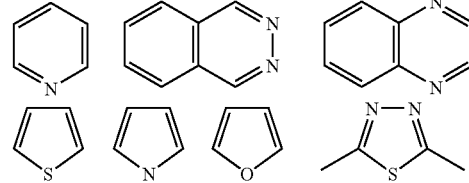

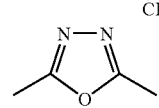

L³ represents a single bond or a divalent alkylene group having from 1 to 10 carbon atoms and at least one —CH₂— group in the alkylene group may be substituted by —O—, —S—, —C(=O)— or —N(R²)— but —O— and —O— are not directly bonded in the alkylene group.

a¹ represents an integer of 0 to 3, preferably 0, 1 or 2, more preferably 0 or 1.

L¹ in formula (I) has the same meaning as L³.

$L^2$ in formula (I) represents a polyvalent cyclic, alkene or alkyne group. Specific examples thereof include the followings in addition to those described above as. specific examples of $M^1$ and $M^2$. This group is bonded at an arbitrary position and functions as a di-, tri-, tetra-, penta- or hexavalent group.

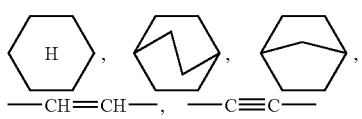

The plurality of Ms bonded through the —$(L^1)_b$—$(L^2)$—$(L^1)_b$— are not conjugated with each other.

The compound represented by formula (I) of the present invention may have a substituent and examples of the substituent include an alkyl group (e.g., methyl, ethyl, isopropyl, tert-butyl), an alkenyl group (e.g., vinyl, allyl, 2-butenyl, 3-pentenyl), an alkynyl group (e.g., propargyl, 3-pentynyl), a substituted or unsubstituted amino group (e.g., unsubstituted amino, methylamino, dimethylamino, diethylamino), an alkoxy group (e.g., methoxy, ethoxy, butoxy), an acyl group (e.g., acetyl, formyl, pivaloyl), an alkoxycarbonyl group (e.g., methoxycarbonyl, ethoxycarbonyl), an acyloxy group (e.g., acetoxy), an acylamino group (e.g., acetylamino), an alkoxycarbonylamino group (e.g., methoxycarbonylamino), a sulfonylamino group (e.g., methanesulfonylamino), a sulfamoyl group (e.g., sulfamoyl, methylsulfamoyl, dimethylsulfamoyl), a carbamoyl group (e.g., unsubstituted carbamoyl, methylcarbamoyl, diethylcarbamoyl), an alkylthio group (e.g., methylthio, ethylthio), a sulfonyl group (e.g., mesyl), a sulfinyl group (e.g., methanesulfinyl), a ureido group (e.g., unsubstituted ureido, methylureido), a phosphoric acid amido group (e.g., diethylphosphoric acid amido), a hydroxy group, a mercapto group, a halogen atom (e.g., fluorine, chlorine, bromine, iodine), a cyano group, an imino group, a heterocyclic group (for example, an aliphatic heterocyclic group having a heteroatom such as nitrogen atom, oxygen atom or sulfur atom; e.g., piperidyl, morpholino) and a silyl group (e.g., trimethylsilyl). These substituents each may further be substituted by such a substituent. When two or more substituents are present, these may be the same or different and if possible, two or more substituents may combine to form a ring.

The compound represented by formula (I) of the present invention is preferably a compound represented by the following formula (II):

Formula (II):

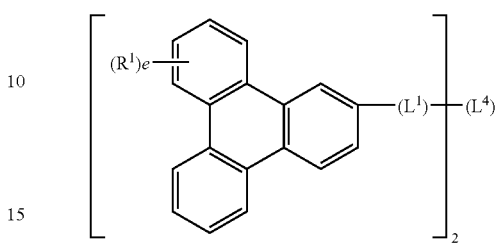

In formula (II):

$R^1$ and $L^1$ have the same meaning as those in formula (I);

$L^4$ represents a divalent cyclic, alkene or alkyne group; and e represents the number of substituents substituted on each of the two triphenylene rings, provided that two triphenylene rings bonded through $L^1$ and $L^4$ are not conjugated.

In formulae (I) and (II), each of a plurality of $R^1$s, Ms and $L^1$s may be the same or different, and is preferably the same from the aspect of synthesis.

In this way, the compound represented by formula (I) or (II) of the present invention does not have an aromatic ring except for the portions represented by M and $L^2$ or $L^4$ in the formula. This is designed so as to reduce the molecular weight, elevate the orientation rate and increase the refractive index anisotropy. Furthermore, although such a design makes it difficult particularly for a discotic liquid crystal to express the liquid crystallinity (in particular, $N_D$ phase), in the present invention, the expression of liquid crystallinity is made possible by integrating the design of bis formation and the purpose of satisfying both the orientation rate and the refractive anisotropy at the same time can be successfully attained.

Specific examples of the compound of the present invention are set forth below, however, the present invention is not limited thereto.

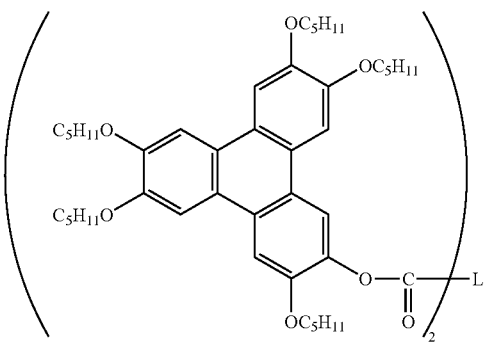

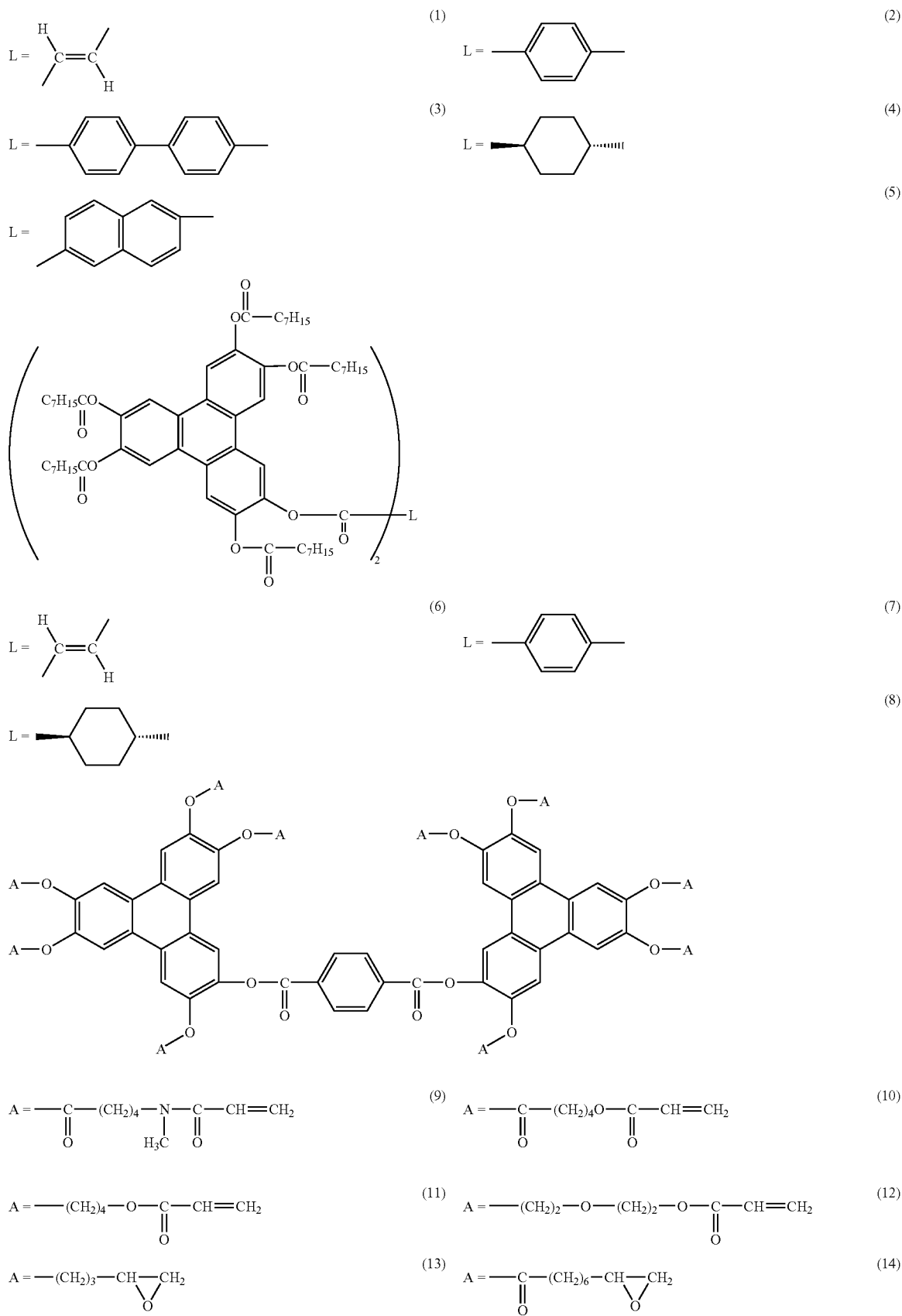

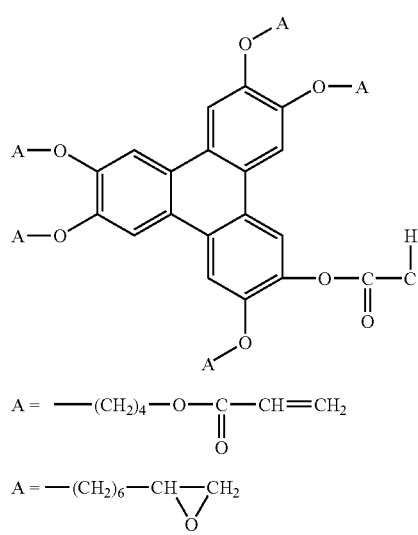
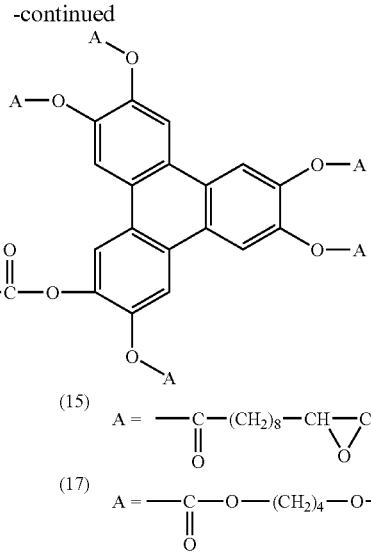

The liquid crystal compound represented by formula (I) has a discotic molecular structure and this compound is a discotic liquid crystal compound. As described in JP-A-11-92420, a compound of expressing an $N_D$ phase (discotic nematic phase) when oriented is particularly preferred in view of use as an optical device.

The compound of the present invention can be synthesized by referring to the methods described, for example, in *Liquid Crystals*, Vol. 29, page 899 (2002), *Organic Letters*, Vol. 4, page 157 (2002), and *Molecular Crystals and Liquid Crystals*, Vol. 357, page 55 (2001). Representative synthesis examples of the compound of the present invention are described below, however, the present invention is not limited thereto.

SYNTHESIS EXAMPLE 1

Synthesis of Compound (1)

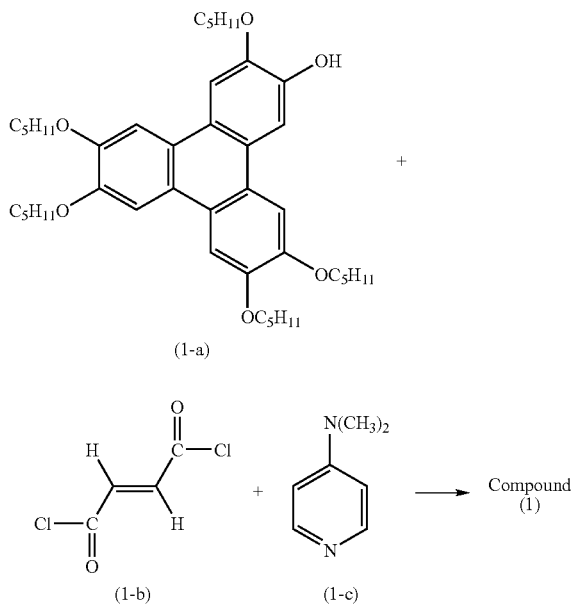

(1-a) (7.41 mmol) and (1-b) (3.37 mmol) were mixed in methylene chloride (100 ml) and the reaction solution was cooled to below 10° C. Thereto, triethylamine (11.3 mmol) was added dropwise and after further adding 50 mg of (1-c), a reaction was allowed to proceed at room temperature for 12 hours. The reaction was quenched by 1M hydrochloric acid and the reaction solution was washed twice with 1M hydrochloric acid. Then, the organic layer was concentrated and the obtained residue was recrystallized from ethyl acetate to obtain Compound (1) in 59% yield. The phase transition temperature was as follows.

Cry: 186° C., Nd: 230° C., Iso.

SYNTHESIS EXAMPLE 2

Synthesis of Compound (7)

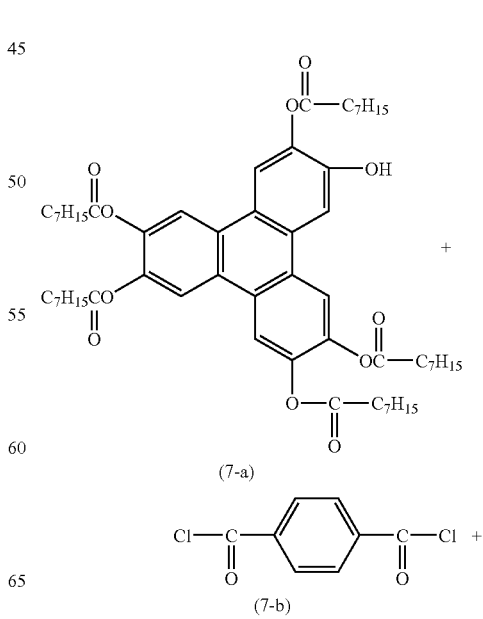

-continued

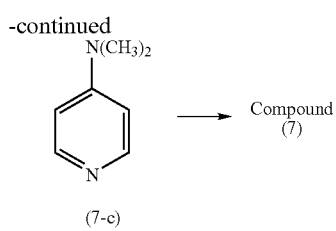 → Compound (7)

(7-c)

(7-a) (1.05 mmol) and (7-b) (0.477 mmol) were mixed in methylene chloride (20 ml) and cooled to below 10° C. Thereto, (7-c) (10 mg) and triethylamine (1.6 mmol) were added. Thereafter, the reaction solution was kept at room temperature and a reaction was allowed to proceed for 10 hours. The reaction was quenched by 1M hydrochloric acid and the reaction solution was washed with 1M hydrochloric acid. Then, the organic layer was concentrated and the residue was purified by silica gel column chromatography (eluent:methylene chloride/hexane=1/1) to obtain Compound (7) in 74% yield. The phase transition temperature was as follows.

Cry: 230° C., Nd: 250° C., Iso.

SYNTHESIS EXAMPLE 3

Synthesis of Compound (3)

Compound (3) was synthesized in the same manner as Compound (1). The phase transition behavior of the compound was measured by using a polarizing microscope, as a result, a columnar phase was exhibited from 147° C. at the temperature dropping time.

SYNTHESIS EXAMPLE 4

Synthesis of Compound (6)

Compound (6) was synthesized in the same manner as Compound (7). The phase transition behavior of the compound was measured by using a polarizing microscope, as a result, an $N_D$ phase was exhibited from 164° C. at the temperature dropping time.

SYNTHESIS EXAMPLE 5

Synthesis of Compound (11)

Compound (11) was synthesized in the same manner as Compound (1). The phase transition behavior of the compound was measured by using a polarizing microscope and found to be as follows:

Cry:138° C., $N_D$: 192° C., Iso.

SYNTHESIS EXAMPLE 6

Synthesis of Compound (15)

Compound (15) was synthesized in the same manner as Compound (7). The phase transition behavior of the compound was measured by using a polarizing microscope and found to be as follows: about 50° C., $N_D$: 152° C., Iso.

SYNTHESIS EXAMPLE 7

Synthesis of Compound (16)

Compound (16) was synthesized in the same manner as Compound (7). The phase transition behavior of the compound was measured by using a polarizing microscope, as a result, an $N_D$ phase was exhibited from 94° C. at the temperature dropping time.

[Production Method of Optically Anisotropic Layer]

The liquid crystal compound of the present invention is once heated to a liquid crystal phase-forming temperature and then cooled while maintaining the oriented state, whereby the liquid crystal compound can be formed into a fixed state (that is, can be fixed) without impairing the oriented state of its liquid crystal stage. The liquid crystal compound of the present invention can also be fixed by heating a composition having added thereto a polymerization initiator to a liquid crystal phase-forming temperature, and then polymerizing and cooling it.

When the oriented state is finally fixed, the liquid crystal compound of the present invention need not exhibit the liquid crystallinity any more. For example, when a polymerizable compound is used as the liquid crystal compound, the polymerizable compound may result in having a high molecular weight and losing the liquid crystallinity as the polymerization or crosslinking reaction proceeds due to a reaction by heat, light or the like.

[Retardation Film]

The retardation film of the present invention can be produced by providing an alignment film on a transparent support and then forming thereon an optically anisotropic layer containing the liquid crystal compound represented by formula (I) of which oriented state is fixed.

The optically anisotropic layer can be obtained by adding, if desired, other additives to the liquid crystal compound of the present invention to prepare a liquid crystal composition as the coating solution, coating the composition on an alignment film and, as described above, fixing it in the oriented state of its liquid crystal stage.

The thickness of the optically anisotropic layer formed of the liquid crystal composition is preferably from 0.1 to 20 μm, more preferably from 0.2 to 15 μm, and most preferably from 0.5 to 10 μm.

[Additive of Optically Anisotropic Layer]

Examples of the additive which can be added to the liquid crystal compound at the formation of the optically anisotropic layer include an air interface orientation controlling agent, an anti-shedding agent, a polymerization initiator and a polymerizable monomer.

(Air Interface Orientation Controlling Agent)

At the air interface, the liquid crystal compound is oriented at a pre-tilt angle of the air interface. The pre-tilt angle includes three kinds of pre-tilt angles, that is, a pre-tilt angle made by the nx refractive index direction and the air interface, a pre-tilt angle made by the ny refractive index direction and the air interface, and a pre-tilt angle made by the nz refractive index direction and the air interface. This pre-tilt angle varies in its degree depending on the compound and therefore, the pre-tilt angle at the air interface must be controlled according to the purpose.

The pre-tilt angle may be controlled by applying an external field such as electric field or magnetic field or by using an additive, but the pre-tilt angle is preferably controlled by using an additive.

This additive is preferably a compound containing one or more, more preferably two or more, substituted or unsubstituted aliphatic group(s) having from 6 to 40 carbon atoms, or substituted or unsubstituted aliphatic substituted oligosiloxanoxy group(s) having from 6 to 40 carbon atoms. For example, the hydrophobic compounds having excluded volume effect described in JP-A-2002-20363 can be used as the air interface orientation controlling agent.

The amount added of the additive for controlling the orientation in the air interface side is preferably from 0.001 to 20 mass %, more preferably from 0.01 to 10 mass %, and most preferably from 0.1 to 5 mass %, based on the liquid crystal compound.

(Anti-Shedding Agent)

In general, the material which is added to the liquid crystal compound so as to prevent the shedding at the coating of the liquid crystal composition is suitably a polymer.

The polymer used is not particularly limited insofar as it does not extremely change the tilt angle or inhibit the orientation of the liquid crystal compound.

Examples of the polymer are described in JP-A-8-95030 and specific examples of the polymer which is particularly preferred include cellulose esters. Examples of the cellulose ester include cellulose acetate, cellulose acetate propionate, hydroxypropylcellulose and cellulose acetate butyrate. In order not to inhibit the orientation of the liquid crystal compound, the amount added of the polymer used for preventing the shedding is generally from 0.1 to 10 mass %, preferably from 0.1 to 8 mass %, more preferably from 0.1 to 5 mass %, based on the liquid crystalline compound.

(Polymerization Initiator)

In the present invention, the liquid crystalline compound is preferably fixed in monodomain alignment, namely, in the substantially uniformly oriented state. For this purpose, when a polymerizable liquid crystal compound is used, the liquid crystal compound is preferably fixed by polymerization.

The polymerization reaction includes a thermal polymerization reaction using a thermal polymerization initiator, a photopolymerization reaction using a photopolymerization initiator, and a polymerization reaction by the irradiation of an electron beam, but for preventing the support or the like from deformation or deterioration due to heat, a photopolymerization reaction and a polymerization reaction by the irradiation of an electron beam are preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimer and p-aminophenyl ketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970). The amount of the photopolymerization initiator used is preferably from 0.01 to 20 mass %, more preferably from 0.5 to 5 mass %, based on the solid content of the coating solution. The light irradiation for the polymerization of the liquid crystal molecule is preferably performed by using an ultraviolet ray. The irradiation energy is preferably from 10 mJ/m$^2$ to 50 J/cm$^2$, more preferably from 50 to 800 mJ/cm$^2$. In order to accelerate the photopolymerization reaction, the light irradiation may be performed under heating. The oxygen concentration in the atmosphere contributes to the polymerization degree and therefore, when a predetermined polymerization degree is not achieved in air, the oxygen concentration is preferably decreased by nitrogen purging or the like. The oxygen concentration is preferably 10% or less, more preferably 7% or less, and most preferably 3% or less.

(Polymerizable Monomer)

In the liquid crystal composition, a polymerizable monomer may be added.

The polymerizable monomer used together with the liquid crystalline compound is not particularly limited insofar as it has compatibility with the liquid crystalline compound and does not extremely change the tilt angle or inhibit the orientation of the liquid crystalline compound. Among these polymerizable monomers, compounds having a polymerization-active ethylenic unsaturated group such as vinyl group, vinyloxy group, acryloyl group and methacryloyl group are preferred. The amount of the polymerizable monomer added is generally from 0.5 to 50 mass %, preferably from 1 to 30 mass %, based on the liquid crystalline compound. When a monomer having two or more reactive functional groups is used, an effect of enhancing the adhesion between the alignment film and the optically anisotropic layer may be provided and therefore, this is particularly preferred.

(Coating Solvent)

The solvent used for the preparation of the liquid crystal composition is preferably an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., toluene, hexane), alkyl halides (e.g., chloroform, dichloromethane), esters (e.g., methyl acetate, butyl acetate), ketones (e.g., acetone, methyl ethyl ketone, methyl isobutyl ketone, cyclohexanone) and ethers (e.g., tetrahydrofuran, 1,2-dimethoxyethane). Among these, alkyl halides, esters and ketones are preferred. Two or more organic solvents may be used in combination.

[Coating Method]

The optically anisotropic layer is formed by preparing a coating solution of the liquid crystal composition by using the above-described solvent and then coating the solution on an alignment film to orient the liquid crystal compound. The coating solution can be coated by a known method (e.g., wire bar coating, extrusion coating, direct gravure coating, reverse gravure coating, die coating).

[Alignment Film]

The alignment film can be provided, for example, by the rubbing of an organic compound (preferably a polymer), by the oblique vapor deposition of an inorganic compound, by the formation of a layer having microgrooves or by the accumulation of an organic compound (e.g., ω-tricosanoic acid, methyl stearate) according to a Langmuir-Blodgett (LB film) method. An alignment film capable of exerting an aligning function upon application of an electric or magnetic field or irradiation with light is also known.

The alignment film may be any layer as long as the liquid crystal compound of the optically anisotropic layer provided on the alignment film can be oriented in desired alignment, however, in the present invention, the alignment film is preferably formed by the rubbing treatment or irradiation with light. In particular, an alignment film formed by rubbing a polymer is preferred. The rubbing treatment can be generally performed by rubbing the surface of the polymer layer with paper or cloth several times along a certain direction, however, in the present invention, this treatment is preferably performed by the method described in *Ekisho Binran (Handbook of Liquid Crystal)*, complied by Ekisho Binran Henshu Iinkai, Maruzen (2000). The thickness of the alignment film is preferably from 0.01 to 10 μm, more preferably from 0.05 to 3 μm.

[Rubbing Density of Alignment Film]

The rubbing density of the alignment film and the pre-tilt angle of the liquid crystal compound at the interface with the alignment film have a relationship such that as the rubbing density is increased, the pre-tilt angle becomes small, whereas as the rubbing density is decreased, the pre-tilt angle becomes large. Therefore, the pre-tilt angle can be adjusted by varying the rubbing density of the alignment film.

The rubbing density of the alignment film can be varied by the method described in *Ekisho Binran* (*Handbook of Liquid Crystal*), complied by Ekisho Binran Henshu Iinkai, Maruzen (2000). The rubbing density (L) is quantified by formula (A):

$$L = Nl(1 + 2\pi rn/60v) \quad \text{Formula (A)}$$

wherein N is the number of rubbings, l is the contact length of the rubbing roller, r is the radius of the roller, n is the rotation number (rpm) of the roller and v is the stage moving speed (per second).

The rubbing density may be elevated by increasing the number of rubbings, the contact length of the rubbing roller, the radius of the roller or the rotation number of the roller or by decreasing the stage moving speed. On the other hand, the rubbing density may be lowered by reversing the increase or decrease of these factors.

[Transparent Support]

With respect to the transparent support for use in the retardation film of the present invention, the material therefor is not particularly limited as long as it mainly exhibits optical isotropy and ensures a light transmittance of 80% or more, however, a polymer film is preferably used.

Specific examples of the polymer include cellulose esters (e.g., cellulose diacetate, cellulose triacetate), norbornene-base polymers, and poly(meth)acrylate esters. Many commercially available polymers can be suitably used. Among these, in view of the optical performance, cellulose esters are preferred and lower fatty acid esters of cellulose are more preferred. The lower fatty acid as used herein means a fatty acid having 6 or less carbon atoms and the number of carbon atoms is preferably 2 (cellulose acetate), 3 (cellulose propionate) or 4 (cellulose butyrate). Of these lower fatty acid esters of cellulose, cellulose triacetate is more preferred. A mixed fatty acid ester such as cellulose acetate propionate and cellulose acetate butyrate may also be used. Furthermore, even in the case of a conventionally known polymer of readily expressing birefringence, such as polycarbonate and polysulfone, those reduced in the expression by modifying the molecule, described in WO00/26705, can be used.

(Cellulose Ester)

The cellulose ester (particularly cellulose acetate) which is preferably used as the transparent support is described in detail below.

The cellulose ester is preferably a cellulose acetate having an acetylation degree of 55.0 to 62.5%, more preferably from 57.0 to 62.0%. The acetylation degree means the amount of acetic acid bonded per the unit mass of cellulose. The acetylation degree is determined according to the Measurement and Calculation of Acetylation Degree described in ASTM: D-817-91 (Test Method of Cellulose Acetate, etc.). The viscosity average polymerization degree (DP) of cellulose ester is preferably 250 or more, more preferably 290 or more. The cellulose ester for use in the present invention preferably has a narrow molecular weight distribution Mw/Mn (Mw is a mass average molecular weight and Mn is a number average molecular weight) as measured by gel permeation chromatography. Specifically, the Mw/Mn value is preferably from 1.0 to 1.7, more preferably from 1.3 to 1.65, and most preferably from 1.4 to 1.6.

In the cellulose ester obtained by a general method, the hydroxyl groups at the 2-position, 3-position and 6-position of cellulose are not evenly distributed in ⅓ portions of the entire substitution degree but the substitution degree of hydroxyl group at the 6-position is liable to become small. In the present invention, the substitution degree of hydroxyl group at the 6-position of cellulose is preferably larger than those at the 2-position and 3-position. The hydroxyl group at the 6-position is preferably substituted by an acyl group to account for 30 to 40%, preferably 31% or more, more preferably 32% or more, of the entire substitution degree. The substitution degree at the 6-position is preferably 0.88 or more. The hydroxyl group at the 6-position may be substituted by an acyl group having 3 or more carbon atoms (e.g., propionyl, butyryl, valeroyl, benzoyl, acryloyl) other than an acetyl group. The substitution degree at each position can be determined by NMR. Cellulose esters having a high substitution degree of hydroxyl group at the 6-position can be synthesized by referring to the methods described in JP-A-11-5851, Synthesis Example 1 (paragraphs 0043 to 0044), Synthesis Example 2 (paragraphs 0048 to 0049) and Synthesis Example 3 (paragraphs 0051 to 0052).

(Retardation Increasing Agent)

In the polymer film used as the transparent support, particularly in the cellulose acetate film, an aromatic compound having at least two aromatic rings may be used as a retardation increasing agent so as to adjust the retardation. In the case of using such a retardation increasing agent, the retardation increasing agent is used in an amount of 0.01 to 20 parts by mass, preferably from 0.05 to 15 parts by mass, more preferably from 0.1 to 10 parts by mass, per 100 parts by mass of the cellulose acetate. Two or more aromatic compounds may be used in combination.

The aromatic ring of the aromatic compound includes an aromatic hydrocarbon ring and an aromaheterocyclic ring.

The aromatic hydrocarbon ring is preferably a 6-membered ring (namely, benzene ring).

The aromaheterocyclic ring is generally an unsaturated heterocyclic ring. The aromaheterocyclic ring is preferably a 5-, 6- or 7-membered ring, more preferably a 5- or 6-membered ring. The aromaheterocyclic ring generally has a largest number of double bonds. The heteroatom is preferably a nitrogen atom, an oxygen atom or a sulfur atom, more preferably a nitrogen atom. Examples of the aromaheterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring.

The aromatic ring is preferably a benzene ring, a furan ring, a thiophene ring, a pyrrole ring, an oxazole ring, a thiazole ring, an imidazole ring, a triazole ring, a pyridine ring, a pyrimidine ring, a pyrazine ring or a 1,3,5-triazine ring, more preferably a benzene ring or a 1,3,5-triazine ring. The aromatic compound preferably contains at least one 1,3,5-triazine ring.

The number of aromatic rings in the aromatic compound is preferably from 2 to 20, more preferably from 2 to 12, still more preferably from 2 to 8, and most preferably from 2 to 6.

The bonding relationship of two aromatic rings can be classified into (a) a case where two aromatic rings are bonded to form a condensed ring, (b) a case where two aromatic rings are directly bonded by a single bond and (c) a case where two aromatic rings are bonded through a linking group (a spiro bond cannot be formed because the rings are an aromatic ring). The bonding relationship may be any one of (a) to (c). Such a retardation increasing agent is described in WO01/88574A1, WO00/2619A1, JP-A-2000-111914, JP-A-2000-275434 and Japanese Patent Application No. 2002-70009.

(Formation of Cellulose Acetate Film)

The cellulose acetate film is preferably produced by preparing a cellulose acetate solution (dope) and forming a film from the solution according to a solvent casting method. In the dope, the above-described retardation, increasing agent may be added.

The dope is cast on a drum or a band and the solvent is evaporated to form a film. The concentration of the dope before casting is preferably adjusted to give a solid content of 18 to 35%. The surface of the drum or band is preferably finished to provide a mirror state. The casting and drying methods in the solvent casting method are described in U.S. Pat. Nos. 2,336,310, 2,367,603, 2,492,078, 2,492,977, 2,492,978, 2,607,704, 2,739,069 and 2,739,070, British Patents 640,731 and 736,892, JP-B-45-4554 (the term "JP-B" as used herein means an "examined Japanese patent publication"), JP-B-49-5614, JP-A-60-176834, JP-A-60-203430 and JP-A-62-115035.

The dope is preferably cast on a drum or band having a surface temperature of 10° C. or less. After the casting, the dope is preferably dried with air for 2 seconds or more. The obtained film is peeled off from the drum or band and the film may be further dried with hot air by sequentially varying the temperature from 100° C. to 160° C. to remove the residual solvent. This method is described in JP-B-5-17844. According to this method, the time from casting until peeling can be shortened. For practicing this method, it is necessary that the dope is gelled at the surface temperature of the drum or band on casting.

Using the prepared cellulose acetate solution (dope), dopes of two or more layers may also be cast to form a film. The dopes are cast on a drum or a band and the solvent is evaporated to form a film. The concentration of each dope before casting is preferably adjusted to give a solid content of 10 to 40%. The surface of the drum or band is preferably finished to provide a mirror state.

In the case of casting a plurality of cellulose acetate solutions, a film may be produced by casting respective cellulose acetate-containing solutions from a plurality of casting ports provided with spacing in the support traveling direction and thereby stacking the layers. For example, the methods described in JP-A-61-158414, JP-A-1-122419 and JP-A-11-198285 can be used. Furthermore, a film may be produced by casting cellulose acetate solutions from two casting ports and for example, the methods described in JP-B-60-27562, JP-A-61-94724, JP-A-61-947245, JP-A-61-104813, JP-A-61-158413 and JP-A-6-134933 can be used. In addition, the method for casting a cellulose acetate film described in JP-A-56-162617 may also be used, where a flow of a high-viscosity cellulose acetate solution is wrapped with a low-viscosity cellulose acetate solution and the high-viscosity and low-viscosity cellulose acetate solutions are simultaneously extruded.

The cellulose acetate film may be further subjected to a stretching treatment to adjust the retardation. The stretching magnification is preferably from 0 to 100%. In the case of stretching the cellulose acetate film for use in the present invention, tenter stretching is preferably used and in order to control the slow axis with high precision, the difference, for example, in the speed or timing of disengagement between right and left tenter clips is preferably reduced as small as possible.

(Additives)

In the cellulose ester film, a plasticizer may be added so as to improve the mechanical properties or increase the drying speed. As the plasticizer, a phosphoric acid ester or a carboxylic acid ester is used. Examples of the phosphoric acid ester include triphenyl phosphate (TPP) and tricresyl phosphate (TCP). Representative carboxylic acid esters are a phthalic acid ester and a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and di-2-ethylhexyl phthalate (DEHP). Examples of the citric acid ester include triethyl O-acetylcitrate (OACTE) and tributyl O-acetylcitrate (OACTB). Other examples of the carboxylic acid ester include butyl oleate, methylacetyl ricinoleate, dibutyl sebacate and various trimellitic acid esters. Among these, phthalic acid ester-base plasticizers (DMP, DEP, DBP, DOP, DPP, DEHP) are preferred, and DEP and DPP are more preferred. The amount of the plasticizer added is preferably from 0.1 to 25 mass %, more preferably from 1 to 20 mass %, and most preferably 3 to 15 mass %, based on the amount of the cellulose ester.

In the cellulose ester film, a deterioration inhibitor (e.g., antioxidant, peroxide decomposer, radical inhibitor, metal inactivating agent, oxygen scavenger, amine) or an ultraviolet inhibitor may be added. The deterioration inhibitor is described in JP-A-3-199201, JP-A-5-1907073, JP-A-5-194789, JP-A-5-271471 and JP-A-6-107854. The amount of the deterioration inhibitor added is preferably from 0.01 to 1 mass %, more preferably from 0.01 to 0.2 mass %, based on the solution (dope) prepared. If the amount added is less than 0.01 mass %, the effect of the deterioration inhibitor can be hardly obtained, whereas if it exceeds 1 mass %, the deterioration inhibitor sometimes bleeds out onto the film surface.

Examples of particularly preferred deterioration inhibitors include butylated hydroxytoluene (BHT). The ultraviolet inhibitor is described in JP-A-7-11056.

(Surface Treatment, Other Physical Properties)

The cellulose acetate film is preferably subjected to a surface treatment. Specific examples of the surface treatment include a corona discharge treatment, a glow discharge treatment, a flame treatment, an acid treatment, an alkali treatment and an ultraviolet irradiation treatment. It is also preferred to provide an undercoat layer as described in JP-A-7-333433.

In these treatments, from the standpoint of keeping the planarity of film, the temperature of the cellulose acetate film is preferably set to Tg (glass transition temperature) or less, specifically, 150° C. or less.

In view of adhesion to the alignment film or the like, the surface treatment of the cellulose acetate film is preferably an acid treatment or an alkali treatment, namely, a saponification treatment to the cellulose acetate film.

The surface treatment is described in detail below by referring to the alkali saponification treatment.

The alkali saponification treatment is preferably performed by a cycle such that the film surface is dipped in an alkali solution, neutralized with an acidic solution, washed with water and dried.

Examples of the alkali solution include a potassium hydroxide solution and a sodium hydroxide solution. The normality of hydroxide ion is preferably from 0.1 to 3.0 N, more preferably from 0.5 to 2.0 N. The temperature of the alkali solution is preferably from room temperature to 90° C., more preferably from 40 to 70° C.

The surface energy of the cellulose acetate film is preferably 55 mN/m or more, more preferably from 60 to 75 mN/m.

The surface energy can be determined by the same method as the method described above for calculating the surface energy of the optically anisotropic layer.

The thickness of the cellulose acetate film is usually from 5 to 500 μm, preferably from 20 to 250 μm, more preferably from 30 to 180 μm, still more preferably from 30 to 110 μm.

[Uses of Retardation Film]

The retardation film of the present invention can be used as an elliptically polarizing plate by combining it with a polarizing film. Furthermore, when applied in combination with a polarizing film to a transmission-type, reflection-type or transflection-type liquid crystal display device, the retardation film contributes to the enlargement of viewing angle.

The elliptically polarizing plate and liquid crystal display device using the retardation film of the present invention are described below.

(Elliptically Polarizing Plate)

An elliptically polarizing plate can be produced by stacking the retardation film of the present invention and a polarizing film. By the use of the retardation film of the present invention, an elliptically polarizing plate capable of enlarging the viewing angle of a liquid crystal display device can be provided.

The polarizing film includes an iodine-type polarizing film, a dye-type polarizing film using a dichroic dye, and a polyene-type polarizing film. The iodine-type polarizing film and dye-type polarizing film are generally produced by using a polyvinyl alcohol-base film. The polarization axis of the polarizing film corresponds to the direction perpendicular to the stretching direction of the film.

The polarizing film is stacked on the optically anisotropic layer side of the retardation film. On the surface of the polarizing film opposite the side where the retardation film is stacked, a transparent protective film is preferably formed. The transparent protective film preferably has a light transmittance of 80% or more. The transparent protective film is generally a cellulose ester film and preferably a triacetyl cellulose film. The cellulose ester film is preferably formed by a solvent casting method. The thickness of the transparent protective film is preferably from 20 to 500 μm, more preferably from 50 to 200 μm.

(Liquid Crystal Display Device)

By the use of the retardation film of the present invention, a liquid crystal display device enlarged in the viewing angle can be provided. The retardation film (optical compensation sheet) for TN-mode liquid crystal cells is described in JP-A-6-214116, U.S. Pat. Nos. 5,583,679 and 5,646,703 and German Patent Publication No. 3911620A1. The retardation film for IPS-mode or FLC-mode liquid crystal cells is described in JP-A-10-54982, the retardation film for OCB-mode or HAN-mode liquid crystal cells is described in U.S. Pat. No. 5,805,253 and International Patent Publication No. WO96/37804, the retardation film for STN-mode liquid crystal cells is described in JP-A-9-26572, and the retardation film for VA-mode liquid crystal cells is described in Japanese Patent 2,866,372.

The retardation film (optical compensation sheet) for liquid crystal cells in various modes can be produced by referring to these patent publications. The retardation film of the present invention can be used for liquid crystal display devices in various display modes such as TN (twisted nematic) mode, IPS (in-plane switching) mode, FLC (ferroelectric liquid crystal) mode, OCB (optically compensatory bend) mode, STN (super twisted nematic) mode, VA (vertically aligned) mode and HAN (hybrid aligned nematic) mode.

The liquid crystal display device comprises a liquid crystal cell, a polarizing element and a retardation film (optical compensation sheet). The polarizing element generally comprises a polarizing film and a protective film. As for the polarizing film and protective film, those described above regarding the elliptically polarizing plate can be used.

The present invention is described in greater detail below by referring to Examples. The materials, reagents, ratios, operations and the like used in Examples can be appropriately changed within the scope of not departing from the technical idea of the present invention. Accordingly, the present invention is not limited to these Examples.

EXAMPLE 1

[Production of High Δn (High Refractive Index Anisotropy) Type Retardation Film]

(Production of Alignment Film)

An alignment film (SE-150 (produced by Nissan Chemicals Industries, Ltd.)) was coated on a glass substrate, heated at 100° C. for 10 minutes and at 200° C. for 1 hour, and then rubbed to form an alignment film layer. The thickness of the obtained alignment film layer was 0.1 μm.

(Formation of Optically Anisotropic Layer)

On the alignment film produced above by rubbing, a dichloromethane solution. of Compound (1) which is a liquid crystal compound of the present invention was coated by using a #4 wire bar. Thereafter, this sample was placed in a constant temperature bath at 200° C. and after holding it for 1 minute, rapidly cooled. As a result, the orientation in the glass state was fixed and an optically anisotropic layer was formed, whereby a retardation film was obtained. The thickness of the optically anisotropic layer was 1.4 μm.

EXAMPLE 2

[Production of Low Wavelength Dispersion Type Retardation Film]

(Formation of Optically Anisotropic Layer)

On the alignment film produced in the same manner as in Example 1, a dichloromethane solution of Compound (7) which is a liquid crystal compound of the present invention was coated by using a #4 wire bar. Thereafter, this sample was placed in a constant temperature bath at 260° C., held for 1 minute, then placed in a constant temperature bath at 230° C. and after holding it for 1 minute, rapidly cooled. As a result, the orientation in the glass state was fixed and an optically anisotropic layer was formed, whereby a retardation film was obtained. The thickness of the optically anisotropic layer was 2.0 μm.

COMPARATIVE EXAMPLE 1

[Production of Comparative Retardation Film]

(Formation of Optically Anisotropic Layer)

On the alignment film produced in the same manner as in Example 1, a dichloromethane solution of Comparative Liquid Crystal Compound (1) shown below was coated by using a #4 wire bar. Thereafter, this sample was placed in a constant temperature bath at 190° C. and after holding it for 1 minute, rapidly cooled. As a result, the orientation in the glass state was fixed and a retardation film was obtained. The thickness of the optically anisotropic layer was 2.0 μm.

Comparative Liquid Crystal Compound (1):

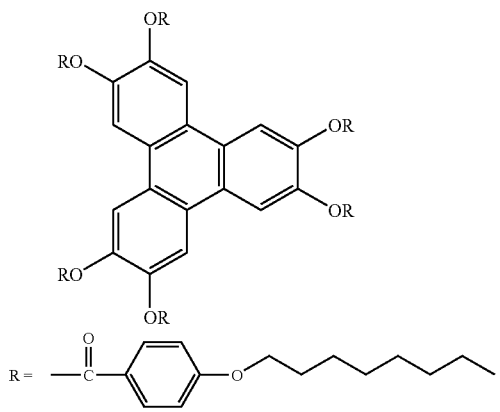

[Evaluation of Retardation Film]

(Measurement of Δn)

The retardation films obtained in Examples 1 and 2 and Comparative Example 1 each was measured on the retardation by using an ellipsometer (APE-100, manufactured by Shimadzu Corporation) at a wavelength of 632.8 nm while changing the observation angle and Δn was calculated according to the method described in *Designing Concepts of the Discotic Negative Compensation Films SID98DIGEST* by imagining the sample as a refractive index ellipsoid model. The results are shown in Table 1.

(Measurement of Wavelength Dispersion)

The wavelength dependency of retardation in the normal direction on the sheet surface of each retardation film obtained in Examples 1 and 2 and Comparative Example 1 was measured by using KOBRA (manufactured by Oji Scientific Instruments). The wavelength dispersion value is shown by a value obtained by dividing the retardation value at 478 nm by the retardation value at 747 nm. The results are shown in Table 1.

(Measurement of Orientation Finish Time)

The time period spent from the initiation of heating until the orientation defect in each liquid crystal compound of Examples 1 and 2 and Comparative Example 1 disappeared to provide monodomain alignment was measured. More specifically, the ripening of orientation was allowed to proceed while keeping the temperature under the observation by a polarizing microscope (OPTIPHOTO2, manufactured by Nikon) and the time period was measured. The results are shown in Table 1.

(Production of Liquid Crystal Display Device)

On a glass substrate having provided thereon an ITO transparent electrode, a polyimide alignment film was provided and subjected to a rubbing treatment. Two sheets of the substrates were superposed with intervention of a spacer of 5 μm such that the alignment films faced each other. Two substrates were disposed while arranging the rubbing directions of alignment films to lie orthogonally. In the gap between the substrates, a rod-like liquid crystal molecule (ZL4792, produced by Merck & Co., Inc.) was injected to form a rod-like liquid crystal layer. The Δn of the rod-like liquid crystal molecule was 0.0969. In both sides of the thus-produced TN liquid crystal cell, two sheets of retardation films produced above each was attached while laying the optical anisotropic layer to face the substrate of the liquid crystal cell. Furthermore, two sheets of polarizing plates each was attached to the outer side thereof to produce a liquid crystal display device. At this time, the rubbing direction of the alignment film of the retardation film was disposed in non-parallel to the rubbing direction of the alignment film of the liquid crystal cell adjacent thereto and the absorption axis of the polarizing plate was disposed in parallel to the rubbing direction of the liquid crystal cell. A voltage was applied to the liquid crystal cell of the liquid crystal display and assuming that the transmittance ratio between the white display and the black display at a white display voltage of 2 V and a black display voltage of 5 V is the contrast ratio, the viewing angle in the region having a contrast ratio of 10 and free of gradation reversal was measured in up/down and right/left sides. Also, the angle dependency of color tinting was evaluated with an eye at the white display and at the black display. The results are shown in Table 1.

TABLE 1

| | Δn | Thickness | Wavelength Dispersion | Orientation Time | Viewing Angle Up/Down | Viewing Angle Right/Left | Change of Color Tinting |
|---|---|---|---|---|---|---|---|
| Example 1 | 0.17 | 1.4 μm | 1.21 | 30 sec. | 92° | 145° | slightly changed |
| Example 2 | 0.12 | 2.0 μm | 1.18 | 60 sec. | 93° | 145° | scarcely changed |
| Comparative Example 1 | 0.11 | 2.1 μm | 1.21 | 65 sec. | 92° | 145° | slightly changed |

As seen from the results in Table 1, the discotic liquid crystal compound of the present invention used in Example 1 has a large Δn value as compared with the conventionally known discotic liquid crystalline compound used in Comparative Example 1. By virtue of this large Δn, the thickness of the optically anisotropic layer can be made small and even the time period necessary for the orientation can be shortened. Furthermore, despite the large Δn, the wavelength dispersion value is on the same level as that of the conventional discotic liquid crystalline compound and this reveals that the performance of the retardation film is maintained.

It is also seen that the discotic liquid crystal compound of the present invention used in Example 2 is reduced in the wavelength dispersion as compared with the conventionally known discotic liquid crystalline compound used in Comparative Example 1. By virtue of this effect, the color tinting as one of performances of the retardation film is improved. Furthermore, despite the small wavelength dispersion, the Δn value was on the same level as that of the conventional discotic liquid crystalline compound and therefore, the film thickness and the orientation time can be maintained.

EXAMPLE 3

[Production of Retardation Film]

(Production of Transparent Support)

The following components were charged into a mixing tank and stirred under heating to prepare a cellulose acetate solution (dope).

[Composition of Cellulose Acetate Solution]

| | |
|---|---|
| Cellulose acetate having an acetylation degree of 60.9% | 100 parts by mass |
| Triphenyl phosphate | 6.5 parts by mass |
| Biphenyl diphenyl phosphate | 5.2 parts by mass |
| Retardation Increasing Agent (1) shown below | 0.1 part by mass |
| Retardation Increasing Agent (2) shown below | 0.2 parts by mass |
| Methylene chloride | 310.25 parts by mass |
| Methanol | 54.75 parts by mass |
| 1-Butanol | 10.95 parts by mass |

Retardation Increasing Agent (1):

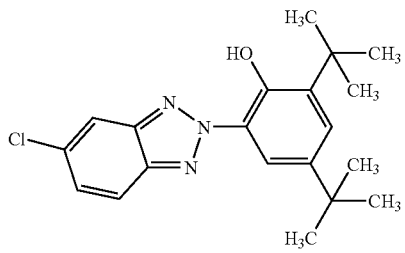

Retardation Increasing Agent (2):

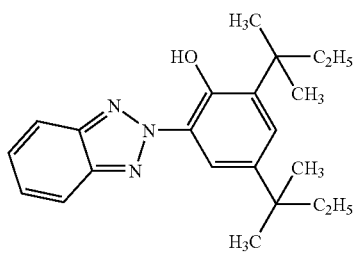

The dope prepared above was cast from a casting port on a drum cooled to 0° C. The film formed was peeled off in the state having a solvent content of 70 mass %. Both edges in the cross direction of the film were fixed by a pin tenter and the film was dried while keeping the distance of giving a stretching percentage of 3% in the cross direction (the direction perpendicular to the machine direction) in the region where the solvent content was from 3 to 5 mass %. Thereafter, the film was further dried by transporting it between rollers of a heat-treating device and adjusted such that the stretching percentage in the machine direction became substantially 0% in the region exceeding 120° C. and the ratio of the stretching percentage in the cross direction to the stretching percentage in the machine direction became 0.75 (by taking account of stretching of 4% in the machine direction at the peeling). In this way, a cellulose acetate film having a thickness of 100 μm was produced. The retardation of the produced film was measured at a wavelength of 632.8 nm, as a result, the retardation in the thickness direction was 40 nm and the in-plane retardation was 4 nm. The produced cellulose acetate film was used as the transparent support.

(Formation of First Undercoat Layer)

On the transparent support, a coating solution having the following composition was coated to a coverage of 28 ml/m² and dried to form a first undercoat layer.

[Composition of Coating Solution for First Undercoat Layer]

| | |
|---|---|
| Gelatin | 5.42 parts by mass |
| Formaldehyde | 1.36 parts by mass |
| Salicylic acid | 1.60 parts by mass |
| Acetone | 391 parts by mass |
| Methanol | 158 parts by mass |
| Methylene chloride | 406 parts by mass |
| Water | 12 parts by mass |

(Formation of Second Undercoat Layer)

On the first undercoat layer, a coating solution having the following composition was coated to a coverage of 7 ml/m² and dried to form a second undercoat layer.

[Composition of Coating Solution for Second Undercoat Layer]

| | |
|---|---|
| Anionic polymer shown below | 0.79 parts by mass |
| Monoethyl citrate | 10.1 parts by mass |
| Acetone | 200 parts by mass |
| Methanol | 877 parts by mass |
| Water | 40.5 parts by mass |

Anionic Polymer:

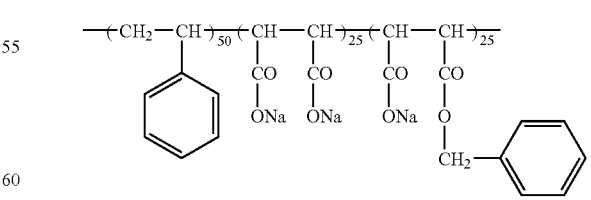

(Formation of Back Layer)

On the opposite surface of the transparent support, a coating solution having the following composition was coated to a coverage of 25 ml/m² and dried to form a back layer.

[Composition of Coating Solution for Back Layer]

| | |
|---|---|
| Cellulose diacetate having an acetylation degree of 55% | 6.56 parts by mass |
| Silica-base matting agent (average particle size: 1 μm) | 0.65 parts by mass |
| Acetone | 679 parts by mass |
| Methanol | 104 parts by mass |

(Formation of Alignment Film)

A modified polyvinyl alcohol shown below and glutaraldehyde (5 mass % of the modified polyvinyl alcohol) were dissolved in a methanol/water mixed solvent (volume ratio=20/80) to prepare a 5 mass % solution.

Modified Polyvinyl Alcohol:

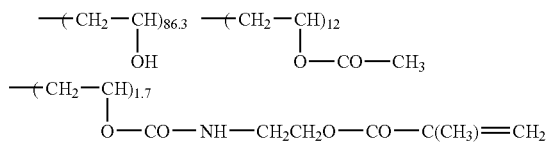

The solution prepared above was coated on the second undercoat layer, dried with hot air of 100° C. for 120 seconds and then rubbed to form an alignment film. The thickness of the obtained alignment film was 0.5 μm.

The rubbing direction of the alignment film was parallel to the casting direction of the transparent support.

(Formation of Optically Anisotropic Layer)

On the alignment film obtained by rubbing, a coating solution for optically anisotropic layer having the following composition was coated by using a #4 wire bar.

[Coating Solution for Optically Anisotropic Layer]

| | |
|---|---|
| Liquid crystal compound of the present invention (Compound (9)) | 100 parts by mass |
| Ethylene oxide-modified trimethylolpropane triacrylate (V#360, produced by Osaka Organic Chemical Industry Ltd.) | 9.9 parts by mass |
| Photopolymerization initiator (Irgacure 907, produced by Nippon Ciba Geigy) | 3.3 parts by mass |
| Sensitizer (Kayacure DETX, produced by Nippon Kayaku Co., Ltd.) | 1.1 parts by mass |
| Methyl ethyl ketone | 250 parts by mass |

After the optically anisotropic layer was coated, the film was placed in a constant temperature bath at 130° C., heated to 125° C. over about 20 seconds and after holding it for 60 seconds, cooled to 80° C. over about 20 seconds. While keeping the same temperature, an ultraviolet ray of 200 mJ/cm$^2$ was irradiated to fix the orientation state of the optically anisotropic layer and then the film was allowed to cool to room temperature, thereby obtaining a retardation film. The thickness of the optically anisotropic layer formed was 1.74 μm.

EXAMPLE 4

[Production of Retardation Film]

On the alignment film produced by rubbing in Example 3, a coating solution for optically anisotropic layer having the following composition was coated by using a #4 wire bar.

[Coating Solution for Optically Anisotropic Layer]

| | |
|---|---|
| Liquid crystal compound (Compound (11)) of the present invention | 100 parts by mass |
| Ethylene oxide-modified trimethylolpropane triacrylate (V#360, produced by Osaka Organic Chemical Industry Ltd.) | 9.9 parts by mass |
| Photopolymerization initiator (Irgacure 907, produced by Nippon Ciba Geigy) | 3.3 parts by mass |
| Sensitizer (Kayacure DETX, produced by Nippon Kayaku Co., Ltd.) | 1.1 parts by mass |
| Methyl ethyl ketone | 250 parts by mass |

After the optically anisotropic layer was coated, the film was placed in a constant temperature bath at 145° C., heated to 140° C. over about 20 seconds and after holding it for 60 seconds, cooled to 95° C. over about 30 seconds. While keeping the same temperature, an ultraviolet ray of 200 mJ/cm$^2$ was irradiated to fix the orientation state of the optically anisotropic layer and then the film was allowed to cool to room temperature, thereby obtaining a retardation film. The thickness of the optically anisotropic layer formed was 1.71 μm.

EXAMPLE 5

[Production of Retardation Film]

On the alignment film produced by rubbing in Example 3, a coating solution for optically anisotropic layer having the following composition was coated by using a #4 wire bar.

[Coating Solution for Optically Anisotropic Layer]

| | |
|---|---|
| Liquid crystal compound (Compound (15)) of the present invention | 100 parts by mass |
| Ethylene oxide-modified trimethylolpropane triacrylate (V#360, produced by Osaka Organic Chemical Industry Ltd.) | 9.9 parts by mass |
| Photopolymerization initiator (Irgacure 907, produced by Nippon Ciba Geigy) | 3.3 parts by mass |
| Sensitizer (Kayacure DETX, produced by Nippon Kayaku Co., Ltd.) | 1.1 parts by mass |
| Methyl ethyl ketone | 250 parts by mass |

After the optically anisotropic layer was coated, the film was placed in a constant temperature bath at 130° C., heated to 125° C. over about 20 seconds and after holding it for 60 seconds, cooled to 80° C. over about 20 seconds. While keeping the same temperature, an ultraviolet ray of 200 mJ was irradiated to fix the orientation state of the optically anisotropic layer and then the film was allowed to cool to room temperature, thereby obtaining a retardation film. The thickness of the optically anisotropic layer formed was 1.75 μm.

COMPARATIVE EXAMPLE 2

[Production of Comparative Retardation Film]

On the alignment film produced in Example 3, a coating solution for optically anisotropic layer having the following composition was coated by using a #4 wire bar.

[Coating Solution for Optically Anisotropic Layer]

| | |
|---|---|
| Discotic liquid crystalline compound (Comparative Liquid Crystal Compound (2)) | 100 parts by mass |
| Ethylene oxide-modified trimethylolpropane triacrylate (V#360, produced by Osaka Organic Chemical Industry Ltd.) | 9.9 parts by mass |
| Photopolymerization initiator (Irgacure 907, produced by Nippon Ciba Geigy) | 3.3 parts by mass |
| Sensitizer (Kayacure DETX, produced by Nippon Kayaku Co., Ltd.) | 1.1 parts by mass |
| Cellulose acetate butyrate (CAB551.0.2, produced by Eastman Chemical) | 2.2 parts by mass |
| (CAB531.1, produced by Eastman Chemical) | 0.55 parts by mass |
| Methyl ethyl ketone | 250 parts by mass |

Comparative Liquid Crystal Compound (2):

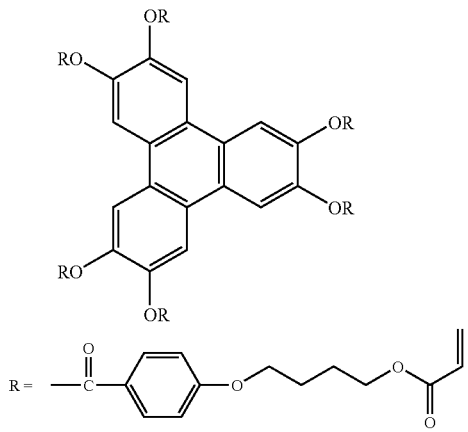

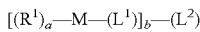

After the optically anisotropic layer was coated, the film was placed in a constant temperature bath at 130° C., heated to 125° C. over about 20 seconds and after holding it for 60 seconds, cooled to 80° C. over about 20 seconds. While keeping the same temperature, an ultraviolet ray of 200 mJ/cm² was irradiated to fix the orientation state of the optically anisotropic layer and then the film was allowed to cool to room temperature, thereby obtaining a retardation film. The thickness of the optically anisotropic layer formed was 1.75 μm.

By using two sheets of each retardation film of Example 3 and Comparative Example 2, a retardation film was attached to both sides of the TN liquid crystal cell produced above, while laying the optical anisotropic layer to face the substrate of the liquid crystal cell. A voltage was applied to the liquid crystal cell of the liquid crystal display. The ratio between the white display and the black display at a white display voltage of 2 V and a black display voltage of 5 V was measured and the angle dependency of color tinting was evaluated with an eye. As a result, the retardation film of Example 3 using the discotic liquid crystalline compound of the present invention was smaller in the change of color tinting than the retardation film of Comparative Example 2.

The retardation film (optical compensation sheet) of the present invention uses a discotic liquid crystalline compound excellent in both the wavelength dispersion property and the refractive index anisotropy for the optically anisotropic layer and therefore, ensures wide viewing angle and less change of color tinting.

The present application claims foreign priority based on Japanese Patent Application Nos. JP 2003-72033, filed Mar. 17 of 2003, the content of which is incorporated herein by reference.

We claim:

1. A retardation film comprising:
   a support;
   an optically anisotropic layer formed of a compound represented by the following formula (I):

$$[(R^1)_a\text{—}M\text{—}(L^1)]_b\text{—}(L^2)$$

wherein $R^1$ represents an alkyl group having 1 to 20 carbon atoms, and at least one —CH$_2$— group in said alkyl group is optionally substituted by —O—, —S—, —C(=O)—, —N(R$^2$)—, —CH=CH— or —C≡C— but —O— and —O— are not directly bonded in said alkyl group;
   $R^2$ represents a hydrogen atom or an alkyl group having 1 to 5 carbon atoms;
   M represents a group comprising at least three aromatic rings;
   $L^1$ represents a single bond or a divalent alkylene group having from 1 to 10 carbon atoms, and at least one —CH$_2$— group in said alkylene group is optionally substituted by —O—, —S—, —C(=O)— or —N(R$^2$)— but —O— and —O— are not directly bonded in the alkylene group;
   $L^2$ represents a cyclic alkene or alkyne group having a valence of b;
   a represents the number of $R^1$(s) substituted on M; and
   b represents an integer of 2 to 6,
   wherein the compound represented by formula (I) is a liciuid crystalline compound comprising a polymerizable group.

2. The retardation film as claimed in claim 1, wherein in the compound represented by formula (I), the plurality of Ms are not conjugated with each other by a multiple bond.

3. The retardation film as claimed in claim 1, wherein M in formula (I) is a group comprising a triphenylene ring.

4. The retardation film as claimed in claim 1, wherein the compound represented by formula (I) exhibits liquid crystallinity.

5. The retardation film as claimed in claim 1, wherein the compound represented by formula (I) is a compound represented by formula (II):

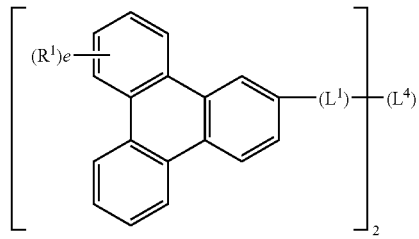

wherein $R^1$ and $L^1$ each has the same meaning as in formula (I);

$L^4$ represents a divalent cyclic, alkene or alkyne group; and e represents the number of $R^1$(s) substituted on each of the two triphenylene rings, provided that the two triphenylene rings bonded through $L^1$ and $L^4$ are not conjugated.

6. A compound represented by the following formula (II):

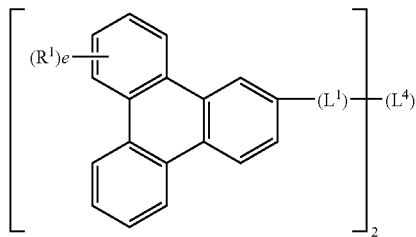

wherein $R^1$ represents an alkyl group having 1 to 20 carbon atoms, and at least one —$CH_2$— group in said alkyl group is optionally substituted by —O—, —S—, —C(=C)—, —N($R^2$)—, —CH=CH— or —C≡C— but —O— and —O— are not directly bonded in said alkyl group;

$L^1$ represents —O—C(=O)—*, wherein * represents the location at which $L^4$ is bonded, $L^4$ represents a divalent cyclic, alkene or alkyne group; and e represents the number of $R^1$(s) substituted on each of the two triphenylene rings, provided that the two triphenylene rings bonded through $L^1$ and $L^4$ are not conjugated, wherein the compound represented by formula (II) is a liquid crystalline compound comprising a polymerizable group.

* * * * *